*(12)* United States Patent
Yamano et al.

(10) Patent No.: US 9,988,075 B2
(45) Date of Patent: Jun. 5, 2018

(54) STEERING CONTROL APPARATUS (71) Applicant: JTEKT CORPORATION, Osaka-shi, Osaka (JP)

(72) Inventors: Naoki Yamano, Okazaki (JP); Hidenori Itamoto, Tajimi (JP); Takashi Kodera, Okazaki (JP); Yoshihiro Yamashita, Okazaki (JP); Koji Anraku, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 97 days.

(21) Appl. No.: 15/292,717

(22) Filed: Oct. 13, 2016

(65) Prior Publication Data

US 2017/0113715 A1 Apr. 27, 2017

(30) Foreign Application Priority Data

Oct. 22, 2015 (JP) .................................. 2015-208003

(51) Int. Cl.
*B62D 5/04* (2006.01)
*B62D 6/00* (2006.01)

(52) U.S. Cl.
CPC ........... *B62D 5/0463* (2013.01); *B62D 6/008* (2013.01)

(58) Field of Classification Search
None
See application file for complete search history.

(56) References Cited

U.S. PATENT DOCUMENTS 5,596,252 A * 1/1997 Shimizu ............... B62D 5/0463
180/446
2006/0090954 A1* 5/2006 Sugitani ................. B62D 5/003
180/446

(Continued)

FOREIGN PATENT DOCUMENTS

EP 2 216 895 A2 8/2010
JP 2011-097763 A 5/2011
(Continued)

OTHER PUBLICATIONS

Jun. 19, 2017 Extended Search Report issued in European Patent Application No. 16194034.1.

(Continued)

*Primary Examiner* — Tamara L Weber
(74) *Attorney, Agent, or Firm* — Oliff PLC (57) ABSTRACT

An update amount calculation processing circuit manipulates a control angle based on an update amount in order to perform feedback-control for causing a steering torque to be adjusted to a target torque. In this case, the update amount calculation processing circuit executes a guard process on the update amount with reference to an estimated amount of change that is a speed equivalent value based on estimation by an induced voltage observer. However, when a command current set by a command current setting processing circuit is zero, the update amount calculation processing circuit determines the estimated amount of change subjected to the guard process to be the update amount. When the command current is zero and the update amount is fixed to a guard value, an electric path between the synchronous motor and a battery is blocked.

6 Claims, 8 Drawing Sheets

(56) References Cited

U.S. PATENT DOCUMENTS

| | | | |
|---|---|---|---|
| 2008/0201041 A1* | 8/2008 | Jiang | B62D 5/046 |
| | | | 701/42 |
| 2011/0118937 A1* | 5/2011 | Kariatsumari | B62D 5/046 |
| | | | 701/41 |
| 2012/0211299 A1 | 8/2012 | Yanai | |
| 2013/0013154 A1* | 1/2013 | Aoki | B62D 5/046 |
| | | | 701/42 |
| 2013/0179039 A1* | 7/2013 | Uryu | B62D 5/0463 |
| | | | 701/42 |
| 2014/0054103 A1* | 2/2014 | Kezobo | B62D 5/0487 |
| | | | 180/446 |
| 2014/0207335 A1* | 7/2014 | Mikamo | B62D 5/046 |
| | | | 701/41 |
| 2016/0200355 A1* | 7/2016 | Mori | B62D 5/0484 |
| | | | 180/446 |
| 2017/0113715 A1 | 4/2017 | Yamano et al. | |

FOREIGN PATENT DOCUMENTS

| | | |
|---|---|---|
| JP | 5440845 B2 | 3/2014 |
| JP | 2017-087764 A | 5/2017 |

OTHER PUBLICATIONS

May 30, 2017 U.S. Appl. No. 15/611,269.
Dec. 7, 2017 Extended Search Report issued in European Patent Application No. 17174745.4.

* cited by examiner

STEERING CONTROL APPARATUS

INCORPORATION BY REFERENCE

The disclosure of Japanese Patent Application No. 2015-208003 filed on Oct. 22, 2015 including the specification, drawings and abstract is incorporated herein by reference in its entirety.

BACKGROUND OF THE INVENTION

1. Field of the Invention

The invention relates to a steering control apparatus intended to operate a steering system that assists steering of a steering wheel in accordance with the steering.

2. Description of the Related Art

Japanese Patent No. 5440845 describes a control apparatus that manipulates a control angle that is input to a current feedback controller configured to allow a synchronous motor to generate an assist torque, in order to perform feedback control for causing a steering torque detected by a torque sensor to be adjusted to a target torque. The control apparatus performs torque feedback control as sensor-less control of the synchronous motor. Coordinate axes of a coordinate system that rotates based on a control angle θc are referred to as a γ axis and a δ axis. A command current value on the γ axis is larger than zero, whereas a command current value on the δ axis is zero. Thus, a q axis current flows according to the amount of shift between the γ axis and the d axis to allow a torque of the synchronous motor to be generated. The amount of shift between the γ axis and the d axis can be manipulated based on the control angle. Consequently, the control angle is manipulated based on the torque feedback control to enable manipulation of the amount of shift between the γ axis and the d axis and to allow control of the torque of the synchronous motor.

The apparatus further calculates the estimated amount of change that is the amount of rotation of the synchronous motor per predetermined time, based on an induced voltage for the synchronous motor. Based on the estimated amount of change, the apparatus then executes a guard process on the amount of update of the control angle that is the amount of operation for the torque feedback control. Japanese Patent No. 5440845 also discloses that, in this case, the estimated amount of change is corrected under a predetermined condition (paragraph [0057]).

The inventor has contrived execution of an additional guard process as a correction process for the estimated amount of change. On the other hand, in the above-described apparatus, the estimated amount of change is only utilized for the guard process for the amount of operation for the torque feedback control. Consequently, if the torque feedback control is functioning, even when the estimated amount of change fails to correspond to an exact rotation speed, the control is prevented from being disabled unless the estimated amount of change deviates excessively from the real rotation speed. However, if the torque feedback control fails to function adequately due to a small command value for a current flowing through the synchronous motor, the control angle is desirably updated in accordance with the estimated amount of control. However, in this case, when the guard process is continuously executed on the estimated amount of change, controllability of the torque of the synchronous motor may be degraded and the synchronous motor may unintentionally be subjected to regenerative control.

SUMMARY OF THE INVENTION

An object of the invention is to provide a steering control apparatus that allows suppression of a possible situation where a synchronous motor may unintentionally be subjected to regenerative control even when a guard process is executed on the estimated amount of change that is the amount of rotation of the synchronous motor calculated based on an induced voltage.

According to an aspect of the invention, a steering control apparatus intended to operate a steering system including a synchronous motor that generates an assist torque, a power conversion circuit that converts a voltage of a DC voltage source into an AC voltage and that applies the AC voltage to the synchronous motor, and a circuit breaker that blocks at least one of an electric path between the DC voltage source and the power conversion circuit and an electric path between the power conversion circuit and the synchronous motor.

The steering control apparatus includes a current control processing circuit that manipulates a voltage applied to the synchronous motor by the power conversion circuit in order to controllably adjust a current flowing through the synchronous motor to a command value, an estimation processing circuit that estimates an induced voltage based on the current flowing through the synchronous motor and voltages applied to terminals of the synchronous motor by the power conversion circuit, and calculates an estimated amount of change that is an amount of rotation of the synchronous motor per predetermined time based on the induced voltage, an estimated-amount-of-change guard processing circuit that executes a guard process on the estimated amount of change, a control angle manipulation processing circuit that manipulates a control angle used as a rotation angle of the synchronous motor by the current control processing circuit in order to control the current, based on the estimated amount of change subjected to the guard process by the estimated-amount-of-change guard processing circuit, and a blockage processing circuit that operates the circuit breaker to block the electric path under conditions that the command value is equal to or smaller than a predetermined value and the estimated amount of change is fixed to a guard value set by the estimated-amount-of-change guard processing circuit.

In the above-described configuration, with the estimated amount of change fixed to the guard value, the amount of shift of the control angle with respect to the actual rotation angle of the synchronous motor may vary over time. In this case, the power conversion circuit is precluded from being operated so as to apply, to the synchronous motor, a voltage that is appropriate for controllably adjusting a current flowing through the synchronous motor to the command value. Therefore, when a rotating shaft of the synchronous motor is rotated by an external force, the synchronous motor may function as a generator. Thus, in the above-described configuration, the blockage processing circuit operates the circuit breaker to block the electric path under the conditions that the command value is equal to or smaller than the predetermined value and the estimated amount of change is fixed to the guard value set by the estimated-amount-of-change guard processing circuit. This allows the synchronous motor to be prevented from acting as a generator to charge the DC voltage source. Therefore, even when the guard process is executed on the estimated amount of change that is the amount of rotation of the synchronous motor calculated based on the induced voltage, the synchronous motor is restrained from being unintentionally subjected to regenerative control.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
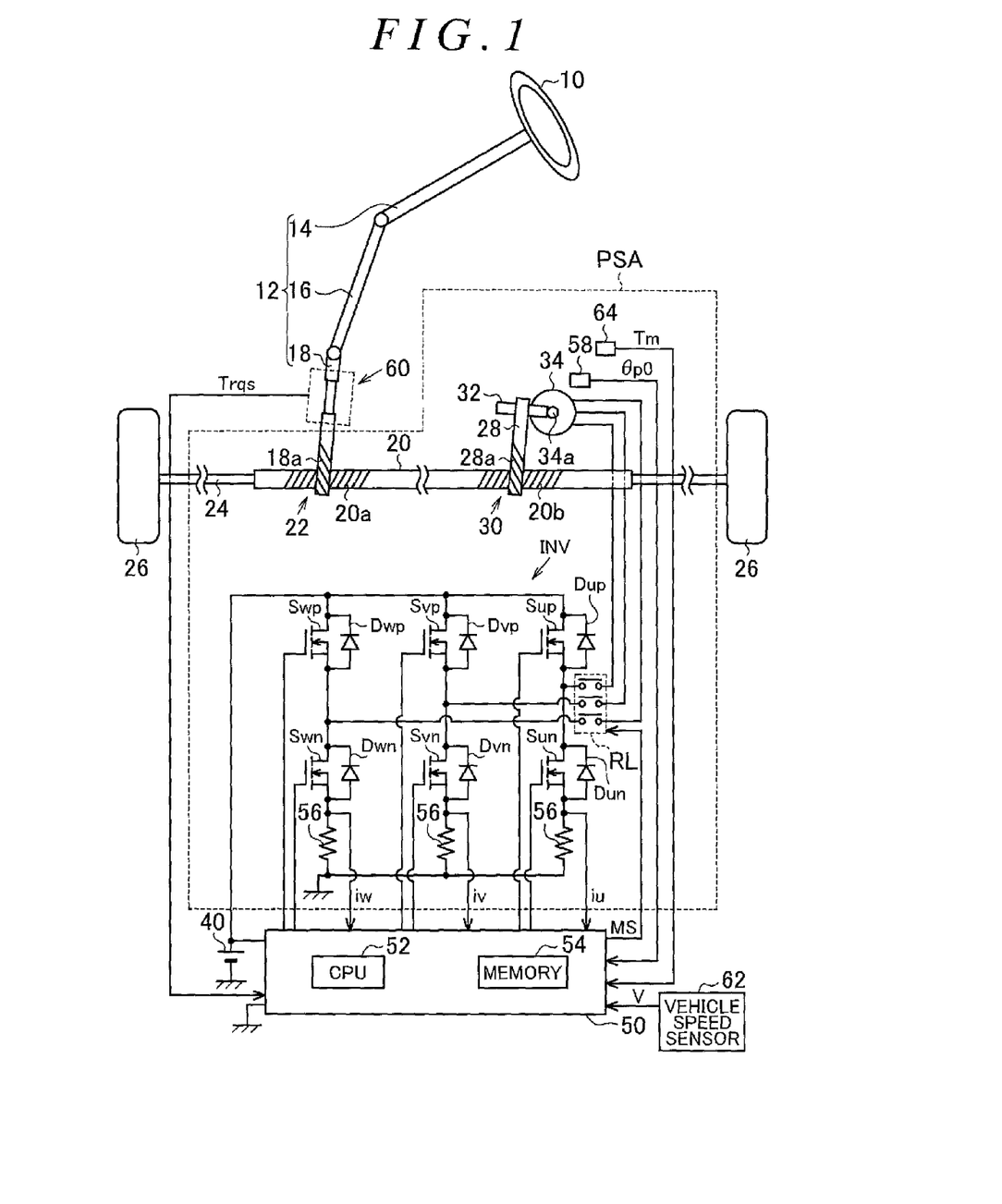
FIG. 1 is a diagram of a configuration of a steering system including a steering control apparatus according to a first embodiment.

A first embodiment according to a steering control apparatus of the invention will be described below with reference to the drawings. As depicted in FIG. 1, in a steering system according to the present embodiment, a steering wheel 10 is fixed to a steering shaft 12, and a rack shaft 21 reciprocates in an axial direction in conjunction with rotation of the steering shaft 12. The steering shaft 12 includes a column shaft 14, an intermediate shaft 16, and a pinion shaft 18 coupled together in this order with the column shaft 14 directly coupled to the steering wheel 10.

The pinion shaft 18 is arranged so as to be able to transmit power to a rack shaft 20 in a steering operation actuator PSA. Specifically, the rack shaft 20 and the pinion shaft 18 are arranged so as to subtend a predetermined crossing angle. First rack teeth 20a formed on the rack shaft 20 mesh with pinion teeth 18a formed on the pinion shaft 18 to provide a first rack and pinion mechanism 22. Tie rods 24 are coupled to respective opposite ends of the rack shaft 20. Tips of the tie rods 24 are coupled to knuckles to which steered wheels 26 are assembled and which are not depicted in the drawings. Therefore, rotation of the steering shaft 12 resulting from operation of the steering wheel 10 is converted into axial displacement of the rack shaft 20 by the first rack and pinion mechanism 22. The axial displacement is transmitted to the knuckles to vary the steered angle of the steered wheels 26, that is, a traveling direction of a vehicle.

The rack shaft 20 is arranged at a predetermined crossing angle to a pinion shaft 28. Second rack teeth 20b formed on the rack shaft 20 mesh with pinion teeth 28a formed on the pinion shaft 28 to provide a second rack and pinion mechanism 30. The pinion shaft 28 is connected to a rotating shaft 34a of a synchronous motor 34 via a reduction mechanism 32 such as a worm and wheel. The synchronous motor 34 is a three-phase surface permanent magnet synchronous motor (SPMSM).

The synchronous motor 34 is connected to a DC voltage source (battery 40) via a relay RL and an inverter INV. The inverter INV is a circuit that electrically connects and disconnects each of a positive electrode and a negative electrode of the battery 40 to and from each of three terminals of the synchronous motor 34.

In FIG. 1, for reference characters for the MOS field transistors (switching elements) included in the inverter INV, the MOS field transistors connected to the three terminals of the synchronous motor 34 are denoted by u, v, and w, an upper arm is denoted by p, and a lower arm is denoted by n. In the description below, u, v, w are collectively denoted as ¥, and p and n are collectively denoted as #. That is, the inverter INV includes a series connection body including switching elements S¥p that electrically connect and disconnect the positive electrode of the battery 40 to the terminals of the synchronous motor 34 and switching elements S¥n that electrically connect and disconnect the negative electrode of the battery 40 to the terminals of the synchronous motor 34. Diodes D¥# are connected in anti-parallel with the switching elements S¥#.

The steering control apparatus (control apparatus 50) includes a central processing unit (CPU 52) and a memory. The control apparatus 50 operates the inverter INV using a torque of the synchronous motor 34 as a control amount to perform assist control that assists operation of the steering wheel 10. In this case, the control apparatus 50 references detection values from various sensors. The sensors include a rotation angle sensor 58 that detects a rotation angle θp0 of the rotating shaft 34a of the synchronous motor 34, a torque sensor 60 that detects a torque (steering torque Trqs) applied to the steering shaft 12, a vehicle speed sensor 62 that detects the traveling speed (vehicle speed V) of the vehicle, and a temperature sensor 64 that detects a temperature Tm of the synchronous motor 34. The control apparatus 50 acquires voltage drops at shunt resistors 56 connected to sources of the switching elements Sun, Svn, and Swn as currents iu, iv, and iw, respectively, and utilizes the currents iu, iv, and iw for assist control.

Figure 2:
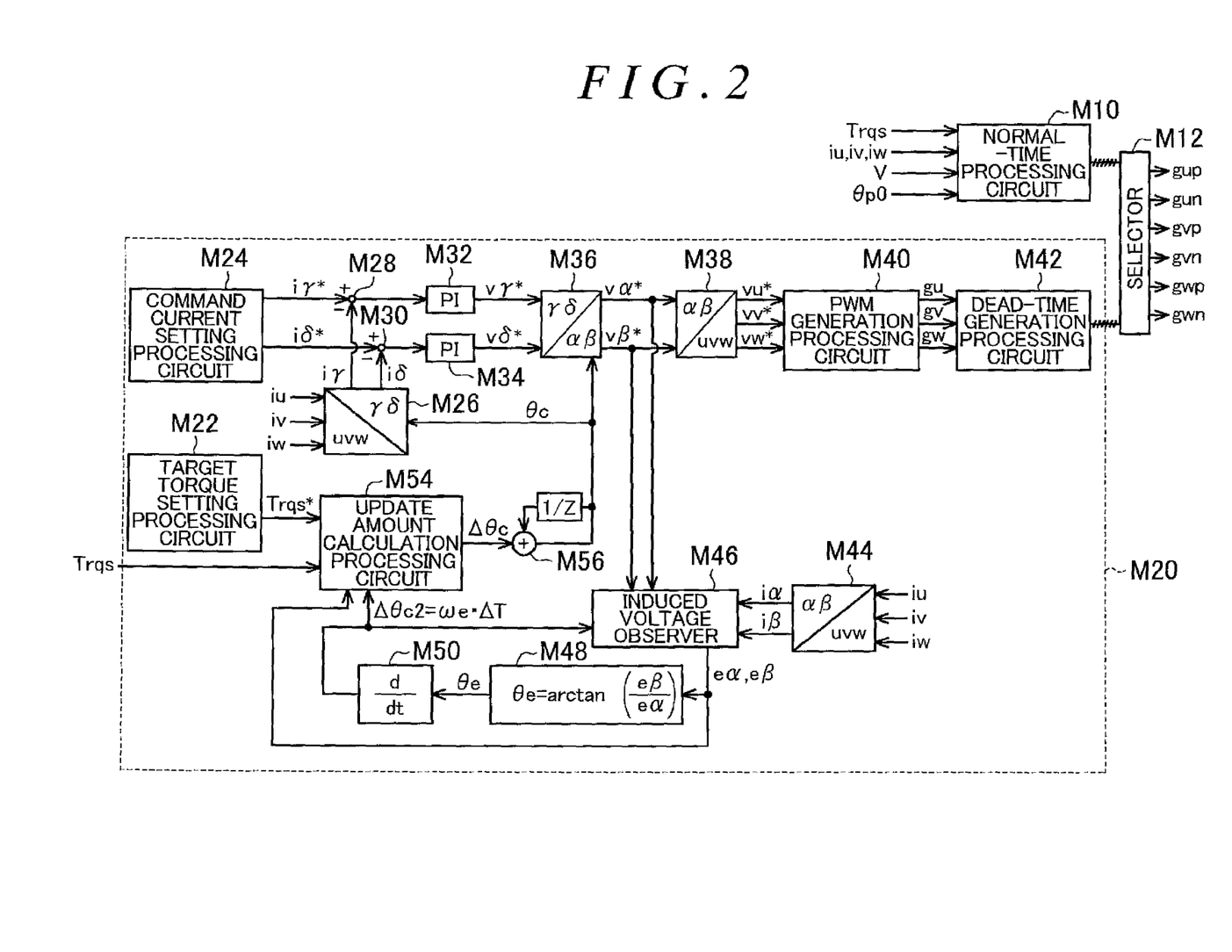
FIG. 2 is a block diagram illustrating a portion of processing implemented by a CPU in the first embodiment.

FIG. 2 illustrates a part of processing executed by the control apparatus 50. FIG. 2 illustrates each type of processing (processing circuit) implemented by the CPU 52 executing programs stored in the memory 54.

A normal-time processing circuit M10 receives as inputs the rotation angle θp0 of the rotating shaft 34a detected by the rotation angle sensor 58, the currents i¥ in different phases of the synchronous motor 34 detected as voltage drops at the shunt resistors 56, the vehicle speed V detected by the vehicle speed sensor 62, and the steering torque Trqs detected by the torque sensor 60 to generate operation signals g¥# for the switching elements S¥# that controls an assist torque of the synchronous motor 34.

A sensor-less processing circuit M20 controls the assist torque of the synchronous motor 34 without using the rotation angle θp0 from the rotation angle sensor 58 if an abnormality occurs in the rotation angle sensor 58.

A selector M12 selectively outputs either the operation signals g¥# from the normal-time processing circuit M10 or the operation signals g¥# from the sensor-less processing circuit M20 to the inverter INV depending on whether or not an abnormality has occurred in the rotation angle sensor 58. However, in actuality, a process is not executed in which the sensor-less processing circuit M20 calculates the operation signals g¥# before an abnormality occurs in the rotation angle sensor 58, and a process is not executed in which the normal-time processing circuit M10 calculates the operation signals g¥# after an abnormality occurs in the rotation angle sensor 58. For a process of determining whether an abnormality has occurred in the rotation angle sensor 58, the presence of an abnormality may be determined when an output value from the rotation angle sensor 58 is continuously fixed for a predetermined time or longer even though the absolute value of the steering torque Trqs is equal to or larger than a predetermined value.

The sensor-less processing circuit M20 will be described below in detail. A target torque setting processing circuit M22 sets a target torque Trqs*. A command current setting processing circuit M24 sets a command current $i\gamma^*$ on a $\gamma$ axis and a command current $i\delta^*$ on a $\delta$ axis in a $\gamma\delta$ coordinate system that is a rotating coordinate system. In particular, in the present embodiment, the command current $i\gamma^*$ on the $\gamma$ axis has a positive value, and the command value $i\delta^*$ on the $\delta$ axis is zero.

A $\gamma\delta$ conversion processing circuit M26 converts the currents iu, iv, and iw in the three-phase fixed coordinate system into the current $i\gamma$ on the $\gamma$ axis and the current $i\delta$ on the axis $\delta$ in the $\gamma\delta$ coordinate system, which is a rotating coordinate system. In this case, a rotation angle utilized for coordinate conversion by the $\gamma\delta$ conversion processing circuit M26 is a control angle $\theta c$ described below.

A deviation calculation processing circuit M28 subtracts the current $i\gamma$ from the command current $i\gamma^*$ on the $\gamma$ axis to output the resultant command. A deviation calculation processing circuit M30 subtracts the current $i\delta$ from the command current $i\delta^*$ on the $\delta$ axis to output the resultant command. A current feedback processing circuit M32 loads the output from the deviation calculation processing circuit M28 to output a command voltage $v\gamma^*$ on the $\gamma$ axis as an amount of operation needed to feed the current $i\gamma$ on the $\gamma$ axis back to the command current $i\gamma^*$ for control. A current feedback processing circuit M34 loads the output from the deviation calculation processing circuit M30 to output a command voltage $v\delta^*$ on the $\delta$ axis as an amount of operation needed to feed the current $i\delta$ on the $\delta$ axis back to the command current $i\delta^*$ for control. Each of the current feedback processing circuits M32 and M34 may output the sum of an output value from a proportional element and an output value from an integral element with respect to the input, as an amount of operation.

An $\alpha\beta$ conversion processing circuit M36 converts command voltages $v\gamma^*$ and $v\delta^*$ on the $\gamma$ and $\delta$ axes into command voltages $v\alpha^*$ and $v\beta^*$ on $\alpha$ and $\beta$ axes. In this case, the $\alpha$ axis is the direction in which a flux travels when a current flows through a stator coil connected to the terminal of the synchronous motor 34 connected to the switching elements Su#. The $\beta$ axis is a direction resulting from counterclockwise rotation from the $\alpha$ axis through 90°. A predetermined rotation angle utilized for coordinate conversion by the $\alpha\beta$ conversion processing circuit M36 is the control angle $\theta c$ described below.

A uvw conversion processing circuit M38 converts the command voltages $v\alpha^*$ and $v\beta^*$ on the $\alpha$ and $\beta$ axes into command voltages vu*, vv*, and vw* in the three-phase fixed coordinate system. A PWM processing circuit M40 generates three-phase PWM signals gu, gv, and gw based on the three-phase command voltages vu*, vv*, and vw*. PWM signals g¥ use a logical H period to specify an on operation period for the switching elements S¥p on the upper arm except for dead time. A dead-time generation processing circuit M42 generates the operation signals g¥# for the switching elements S¥# based on the PWM signals g¥ and outputs the operation signals g¥# to the inverter INV. Dead time is applied to the operation signals g¥# such that, before an off operation of a first switching element of the switching elements S¥p on the upper arm and the switching elements S¥n on the lower arm is switched to an on operation of the first switching element, an off operation of a second switching element is performed.

The $\alpha\beta$ conversion processing circuit M44 converts the currents iu, iv, and iw into currents $i\alpha$ and $i\beta$ in the coordinate system. An induced voltage observer M46 estimates induced voltages $e\alpha$ and $e\beta$ on the $\alpha$ and $\beta$ axes based on the currents $i\alpha$ and $i\beta$ output by the conversion processing circuit M44, the command voltages $v\alpha^*$ and $v\beta^*$, and an estimated amount of change $\Delta\theta c2$ described below. An angle calculation processing circuit M48 calculates an estimated angle $\theta e$ as an output value of an arctangent function using, as an input, a ratio $e\beta/e\alpha$ of the estimated induced voltages $e\alpha$ and $e\beta$. A speed calculation processing circuit M50 calculates the estimated amount of change $\Delta\theta c2$ using, as an input, the estimated angle $\theta e$. The estimated amount of change $\Delta\theta c2$ is indicative of the amount of change in the estimated angle $\theta e$ per predetermined time $\Delta T$. The use of a speed of change $\omega e$ in the estimated angle $\theta e$ allows the estimated amount of change $\Delta\theta c2$ to be represented as $\omega e \cdot \Delta T$.

An update amount calculation processing circuit M54 calculates an update amount $\Delta\theta c$ by which the control angle $\theta c$ is updated to output the update amount $\Delta\theta c$. An update processing circuit M56 updates the control angle $\theta c$ by adding the current update amount $\Delta\theta c$ to the control angle $\theta c$ in the last control period. The predetermined time $\Delta T$ coincides with control periods.

The present embodiment assumes that a current flowing through the synchronous motor 34 is controllably set in a region in a rotating coordinate system between a positive side of a d axis and a positive side of a q axis. In other words, the phase of the current is assumed to be controllably set in a region from −90° to 0°. In this case, a positive direction of the d axis corresponds to the direction of a magnetic pole, and a positive direction of the q axis is a direction shifted from the d axis through an electrical angle of 90° in a direction in which the synchronous motor 34 rotates. The phase of the current is defined as an angle subtended between the direction of a current vector (in this case, the positive direction of the $\gamma$ axis) and the q axis and to be positive in a rotating direction from the q axis. Unless otherwise specified, the rotating direction of the synchronous motor 34 is positive, and a torque in the rotating direction is a positive torque. In this case, the phase of the current is constant when the update amount $\Delta\theta c$ for the control angle $\theta c$ is equal to the actual amount of rotation of the synchronous motor 34 per predetermined time $\Delta T$. In contrast, the phase of the current changes such that the current vector is advanced when the update amount $\Delta\theta c$ for the control angle $\theta c$ is larger than the actual amount of rotation of the synchronous motor 34 per predetermined time $\Delta T$. The phase of the current changes such that the current vector is retarded when the update amount $\Delta\theta c$ is smaller than the actual amount of rotation of the synchronous motor 34 per predetermined time $\Delta T$. Thus, in the present embodiment, the control angle $\theta c$ is manipulated as a parameter that sets the phase of the current to manipulate the phase of the current.

Figure 3:
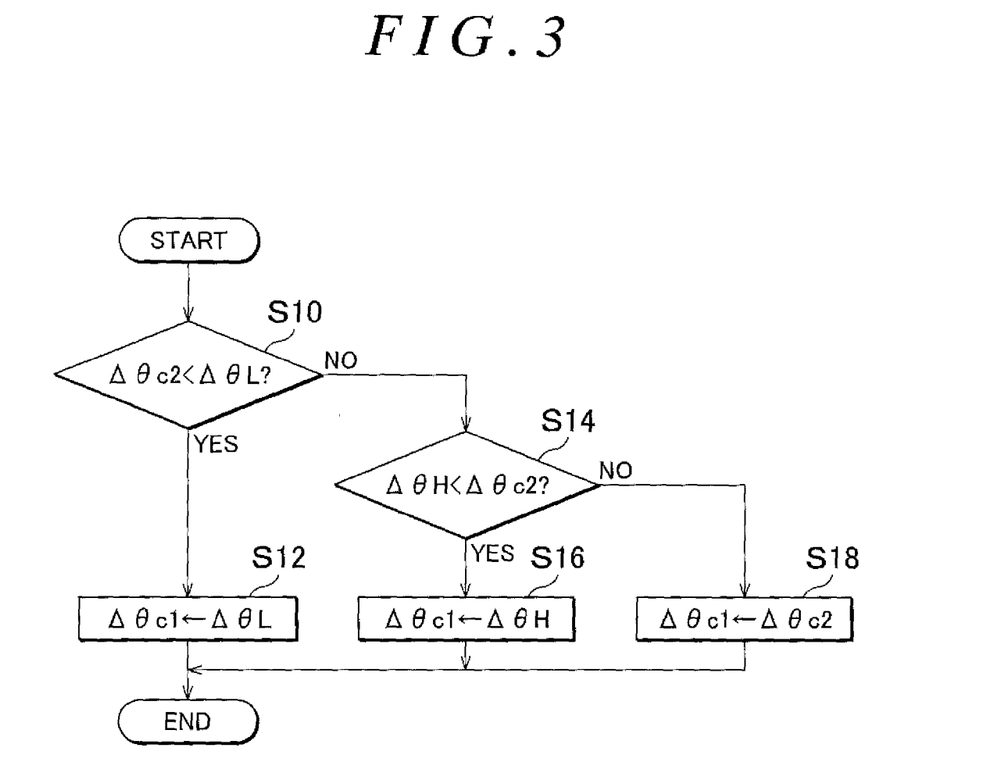
FIG. 3 is a diagram illustrating a procedure of processing of an update amount calculation processing circuit according to the first embodiment.

FIG. 3 illustrates processing of the update amount calculation processing circuit M54. This processing is repeatedly executed with the above-described control period. In the series of processes illustrated in FIG. 3, the update amount calculation processing circuit M54 first determines whether or not the estimated amount of change $\Delta\theta c2$ is smaller than a lower limit value for estimation $\Delta\theta L$ (S10). Upon determining that the estimated amount of change $\Delta\theta c2$ is smaller than a lower limit value for estimation $\Delta\theta L$ (S10: YES), the update amount calculation processing circuit M54 executes a guard process on the estimated amount of change $\Delta\theta c2$ to determine an estimated amount of change $\Delta\theta c1$ that is the estimated amount of change $\Delta\theta c2$ subjected to the guard process to be the lower limit value for estimation $\Delta\theta L$ (S12). The lower limit value for estimation $\Delta\theta L$ is set to a lower limit value assumed to be a possible value of the estimated amount of change $\Delta\theta c2$. Upon determining that the estimated amount of change $\Delta\theta c2$ is larger than the lower limit value for estimation $\Delta\theta L$ (S10: NO), the update amount calculation processing circuit M54 determines whether the estimated amount of change $\Delta\theta c2$ is larger than an upper limit value for estimation $\Delta\theta H$ (S14). The upper limit value for estimation $\Delta\theta H$ is set to an upper limit value assumed to be a possible value of the estimated amount of change $\Delta\theta c2$. Upon determining that the estimated amount of change $\Delta\theta c2$ is larger than the upper limit value for estimation $\Delta\theta H$ (S14: YES), the update amount calculation processing circuit M54 executes a guard process on the estimated amount of change $\Delta\theta c2$ to determine the estimated amount of change $\Delta\theta c1$ that is the estimated amount of change $\Delta\theta c2$ subjected to the guard process to be the upper limit value for estimation $\Delta\theta H$ (S16). Upon determining that the estimated amount of change $\Delta\theta c2$ is equal to or smaller than the upper limit value for estimation $\Delta\theta H$ (S14: NO), the update amount calculation processing circuit M54 determines the estimated amount of change $\Delta\theta c1$ to be the estimated amount of change $\Delta\theta c2$ (S18).

Figure 4:
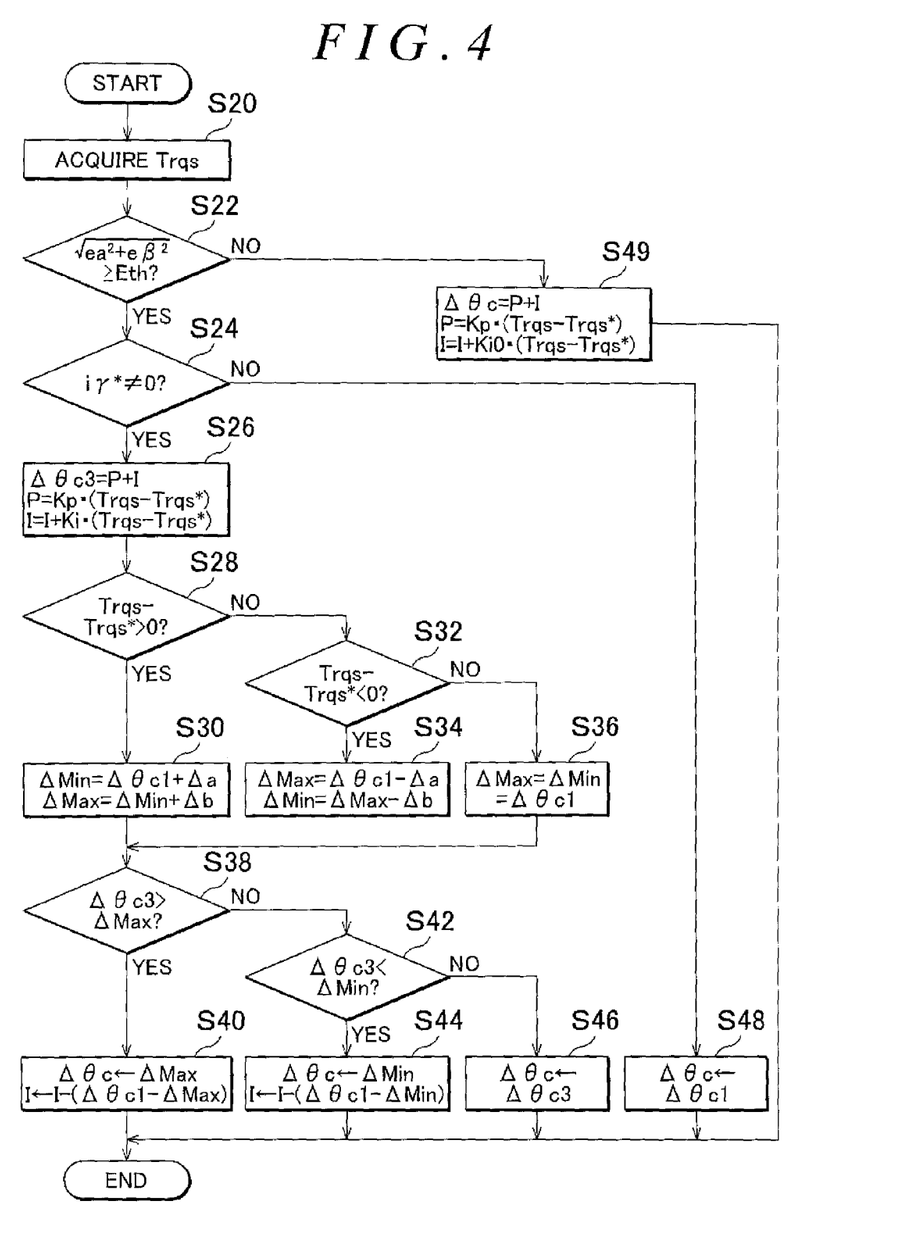
FIG. 4 is a diagram illustrating a procedure of processing of the update amount calculation processing circuit according to the first embodiment.

The update amount calculation processing circuit M54 temporarily ends the series of processes illustrated in FIG. 3 when completing the processing in steps S12, S16, and S18. FIG. 4 illustrates another type of processing executed by the update amount calculation processing circuit M54. This processing is executed with the above-described control period.

In the series of processes illustrated in FIG. 4, the update amount calculation processing circuit M54 first acquires the steering torque Trqs (S20). The update amount calculation processing circuit M54 then determines whether the vector norm of the induced voltages $e\alpha$ and $e\beta$ is equal to or larger than a specified value Eth (S22). The vector norm is a parameter that quantizes the magnitude of the amplitude of the induced voltage of the synchronous motor 34. The specified value Eth is set to a lower limit value of the norm of the induced voltage vector obtained when the rotation angle and the rotation speed are estimated at a specified accuracy or higher by the induced voltage observer M46. Upon determining that the vector norm is equal to or larger than the specified value Eth (S22: YES), the update amount calculation processing circuit M54 determines whether or not the command current $i\gamma^*$ is zero (S24). Upon determining that the command current $i\gamma^*$ is not zero (S24: YES), the update amount calculation processing circuit M54 calculates an update amount $\Delta\theta c3$ using, as an input value, a value resulting from subtraction of the target torque Trqs* from the steering torque Trqs (S26). Specifically, the update amount calculation processing circuit M54 updates an output value I from an integral element using, as an input value, the value resulting from subtraction of the target torque Trqs* from the steering torque Trqs and also using a gain Ki, uses the gain Ki to update an output value P from a proportional element, and determines a sum of the output value I from the integral element and the output value P from a proportional element to be an update amount $\Delta\theta c3$.

In the present embodiment, gains Kp and Ki have positive values so as to allow the control angle $\theta c$ to be increased in order to increase the assist torque of the synchronous motor 34. This corresponds to the assumption that the current flowing through the synchronous motor 34 is controllably set in the region in the rotating coordinate system between the positive side of the d axis and the positive side of the q axis as described above. When the current is controllably set in the above-described region, the magnitude of component of the current vector in the positive direction of the q axis increases consistently with advancement of the current vector. If the steering torque Trqs is higher than the target torque Trqs*, the assist torque of the synchronous motor 34 is insufficient for controllable adjustment of the steering torque Trqs to the target torque Trqs*. Therefore, when the value resulting from subtraction of the target torque Trqs* from the steering torque Trqs is positive, the update amount $\Delta\theta c$ is positive.

The update amount calculation processing circuit M54 then determines whether or not the value resulting from subtraction of the target torque Trqs* from the steering torque Trqs is positive (S28). Upon determining that the value resulting from subtraction of the target torque Trqs* from the steering torque Trqs is positive (S28: YES), the update amount calculation processing circuit M54 determines a lower limit value $\Delta$Min of the update amount $\Delta\theta c$, which is an output value from the update amount calculation processing circuit M54, to be a value resulting from addition of a predetermined value $\Delta a$ (>0) to the estimated amount of change $\Delta\theta c1$. The update amount calculation processing circuit M54 also determines an upper limit value $\Delta$Max of the update amount $\Delta\theta c$ to be a value resulting from addition of a width specified value $\Delta b$ (>0) to the lower limit value $\Delta$Min (S30). This processing is intended to specify an appropriate range for the update amount $\Delta\theta c$ as an amount of operation needed to controllably adjust the steering torque Trqs to be the target torque Trqs*. That is, when an affirmative determination is made in step S28, the assist torque is insufficient. On the other hand, the assist torque of the synchronous motor 34 increases with advancement of the phase of the current flowing through the synchronous motor 34 as described above. Thus, to allow the phase of the current flowing through the synchronous motor 34 to be advanced, the update amount $\Delta\theta c$ for the control angle $\theta c$ needs to be larger than the actual amount of rotation of the synchronous motor 34 per predetermined time $\Delta T$. The actual amount of rotation is considered to be equivalent to the estimated amount of change $\Delta\theta c1$, and thus, the lower limit value $\Delta$Min and the upper limit value $\Delta$Max correspond to the amounts of rotation larger than the estimated amount of change $\Delta\theta c1$.

Upon determining that the value resulting from subtraction of the target torque Trqs* from the steering torque Trqs is not positive (S28: NO), the update amount calculation processing circuit M54 determines whether or not the value resulting from subtraction of the target torque Trqs* from the steering torque Trqs is negative (S32). Upon determining that the value resulting from subtraction of the target torque Trqs* from the steering torque Trqs is negative (S32: YES), the update amount calculation processing circuit M54 determines the upper limit value $\Delta$Max of the update amount $\Delta\theta c$, which is an output value from the update amount calculation processing circuit M54, to be a value resulting from subtraction of the predetermined value $\Delta a$ from the estimated amount of change $\Delta\theta c1$. The update amount calculation processing circuit M54 also determines the lower limit value $\Delta$Min of the update amount $\Delta\theta c$ to be a value resulting from subtraction of the width specified value $\Delta b$ from the upper limit value $\Delta$Max (S34). This processing is intended to specify an appropriate range for the update amount $\Delta\theta c$ as an amount of operation needed to controllably adjust the steering torque Trqs to the target torque Trqs* when the assist torque of the synchronous motor 34 is excessively high.

Upon determining that the value resulting from subtraction of the target torque Trqs* from the steering torque Trqs is not negative (S32: NO), the update amount calculation processing circuit M54 determines both the upper limit value ΔMax and the lower limit value ΔMin to be the estimated amounts of change Δθc1 (S36).

The update amount calculation processing circuit M54 then determines whether or not the update amount Δθc3 is larger than the upper limit value ΔMax (S38). Upon determining that the update amount Δθc3 is larger than the upper limit value ΔMax (S38: YES), the update amount calculation processing circuit M54 executes, as a guard process, a process of determining the update amount Δθc to be output by the update amount calculation processing circuit M54 to be the upper limit value ΔMax, and corrects the output value I from the integral element by Δθc−ΔMax as a wind-up measure for the integral element (S40).

Upon determining that the update amount Δθc3 is not larger than the upper limit value ΔMax (S38: NO), the update amount calculation processing circuit M54 determines whether or not the update amount Δθc3 is smaller than the lower limit value ΔMin (S42). Upon determining that the update amount Δθc3 is smaller than the lower limit value ΔMin (S42: YES), the update amount calculation processing circuit M54 executes, as a guard process, a process of determining the update amount Δθc to be output by the update amount calculation processing circuit M54 to be the lower limit value ΔMin, and corrects the output value I from the integral element by Δθc1−ΔMin as a wind-up measure for the integral element (S44).

Upon determining that the update amount Δθc3 is not smaller than the lower limit value ΔMin (S42: NO), the update amount calculation processing circuit M54 determines the update amount Δθc to be output by the update amount calculation processing circuit M54 to be the update amount Δθc3 calculated in step S26 (S46). Upon determining that the command current iγ* is zero (S24: NO), the update amount calculation processing circuit M54 determines the update amount Δθc to be the estimated amount of change Δθc1 (S48).

Upon determining that the vector norm is smaller than the specified value Eth (S22: NO), in other words, upon determining that the estimated rotation speed is lower than a predetermined speed, the update amount calculation processing circuit M54 calculates the update amount Δθc using, as an input value, the value resulting from subtraction of the target torque Trqs* from the steering torque Trqs (S49). Specifically, the update amount calculation processing circuit M54 updates the output value I from the integral element using, as an input value, the value resulting from subtraction of the target torque Trqs* from the steering torque Trqs and also using a gain Ki0, use the gain Kp to update the output value P from the proportional element, and determines the sum of the output value I from the integral element and the output value P from the proportional element to be the update amount Δθc. In the present embodiment, the gain Ki0 is different from the gain Ki.

The update amount calculation processing circuit M54 temporarily ends the series of processes illustrated in FIG. 4 when completing the processing in steps S40, S44, S46, S48, and S49. In actuality, a rotating direction of the rotating shaft 34a of the synchronous motor 34 varies between a right turning operation and a left turning operation of the steering wheel 10. However, the processing illustrated in FIG. 4 represents logic in which the rotating direction of the rotating shaft 34a of the synchronous motor 34 is positive regardless of the direction in which the synchronous motor 34 rotates. However, when outputting the update amount 40c to an update processing circuit M56 in FIG. 2, the update amount calculation processing circuit M54 executes an appropriate process such as a change in sign to set, for example, in step S30, the lower limit value ΔMin to an amount of rotation larger than the actual amount of rotation of the synchronous motor 34 (estimated amount of change Δθc2) regardless of the direction in which the synchronous motor 34 rotates.

A negative determination in step S24 described above, that is, a command current iγ* of zero, results from a request for protection from overheat of the synchronous motor 34. This will be described below.

Figure 5:
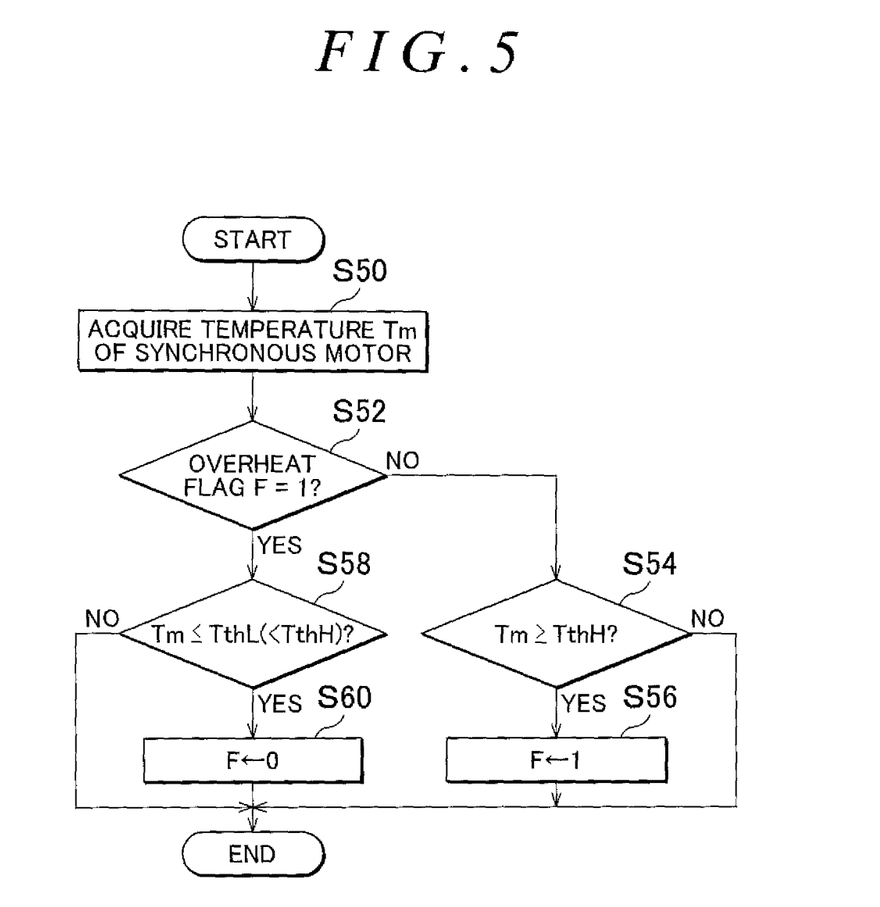
FIG. 5 is a flow diagram illustrating a procedure of overheat determination processing according to the first embodiment.

FIG. 5 illustrates a procedure of overheat determination processing. This processing is repeatedly executed, for example, with a predetermined period by the CPU 52. In the series of processes, the CPU 52 first acquires a temperature Tm detected by the temperature sensor 64 (S50). The CPU 52 then determines whether or not an overheat flag F is 1 (S52). The overheat flag F is 1 when the overheat protection processing for the synchronous motor 34 is in execution and is 0 when the overheat protection processing for the synchronous motor 34 is not in execution. Upon determining that the overheat flag F is not 1 (S52; NO), the CPU 52 determines whether or not the temperature Tm is equal to or higher than a specified temperature TthH (S54). The specified temperature TthH is set to a lower limit value of the temperature for which the overheat protection processing for the synchronous motor 34 is requested. Upon determining that the temperature Tm is equal to or higher than the specified temperature TthH (S54: YES), the CPU 52 sets the overheat flag F to 1 (S56).

Upon determining that the overheat flag F is 1 (S52; YES), the CPU 52 determines whether or not the temperature Tm is equal to or lower than a recovery temperature TthL lower than the specified temperature TthH (S58). Upon determining that the temperature Tm is equal to or lower than the recovery temperature TthL (S58: YES), the CPU 52 sets the overheat flag F to 0 (S60).

Figure 6:
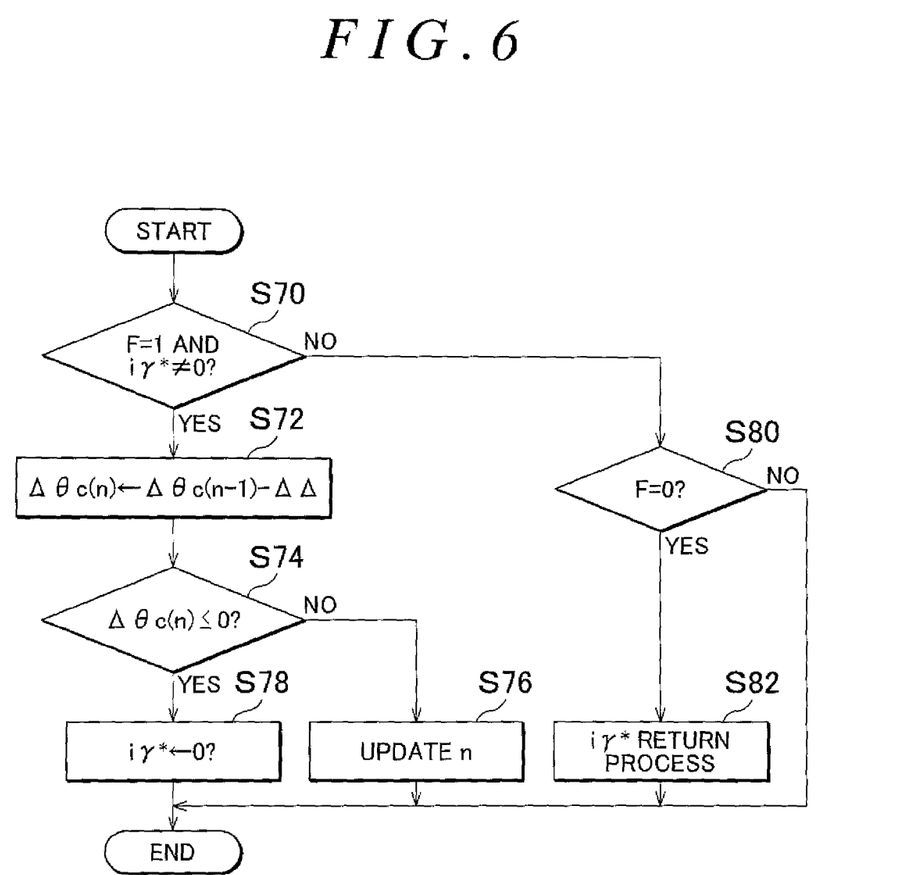
FIG. 6 is a flow diagram illustrating a procedure of overheat protection processing according to the first embodiment.

The CPU 52 temporarily ends the series of processes illustrated in FIG. 5 when completing the processing in steps S56 and S60 and making a negative determination in steps S54 and S58. FIG. 6 illustrates a procedure of overheat protection processing. This processing is repeatedly executed, for example, with a predetermined period by the CPU 52.

In the series of processes illustrated in FIG. 6, the CPU 52 determines whether or not a logical product of the overheat flag F being 1 and the command current iγ* not being zero is true (S70). This process is intended to determine whether or not the command current iγ* has not been set to zero in spite of a request for overheat protection processing. Upon determining that the logical product is true (S70: YES), the CPU 52 determines the current update amount Δθc(n) to be a value resulting from subtraction of a specified amount ΔΔ from the last update amount Δθc(n−1) (S72). When this process is executed, the update amount Δθc determined by the processing in FIG. 4 is invalidated. That is, the process in step S72 is executed by the update amount calculation processing circuit M54, which outputs the value calculated in step S72 to the update processing circuit M56. Subsequently, the CPU 52 determines whether or not the current update amount Δθc(n) is equal to or smaller than zero (S74).

This process is intended to determine whether or not a timing to set the command current iγ* to zero has been reached.

Upon determining that the current update amount Δθc(n) is equal to or smaller than zero (S74: YES), the CPU 52 determines the command value iγ* to zero (S78). Upon determining that the current update amount Δθc(n) is larger than zero (S74: NO), the CPU 52 updates a variable n (S76). Thus, the current update amount Δθc(n) is set to the last update amount Δθc(n−1).

Upon determining that the logical product is false (S70: NO), the CPU 52 determines whether or not the overheat flag F is zero (S80). This process is intended to determine whether or not a cancellation condition for the overheat protection processing has been established. Upon determining that the overheat flag F is zero (S80: YES), the CPU 52 returns the command value iγ* to a value larger than zero (S82).

The CPU 52 temporarily ends the series of processes when completing the processing in steps S76, S78, and S82 and making a negative determination in step S80. When the command value iγ* is thus set to zero, the update amount calculation processing circuit M54 executes the processing illustrated in FIG. 4 to stop the torque feedback control. In this case, the control angle θc is updated using the estimated amount of change Δθc1 as the update amount Δθc. Consequently, the control angle θc is updated according to the rotation speed of the synchronous motor 34. Therefore, the current flowing through the synchronous motor 34 can be controllably adjusted to zero. That is, Equations (c1) and (c2) illustrated below are equations for voltages on the d and q axes for the synchronous motor 34.

$$vd = R \cdot id - \omega \cdot L \cdot iq \quad (c1)$$

$$vq = \omega \cdot L \cdot id + R \cdot iq + \phi \cdot \omega \quad (c2)$$

The equations include a resistance R, an inductance L, a counter electromotive voltage constant φ, and an electrical angular velocity ω. When the currents id and iq are controllably set to zero, the voltages vd and vq on the d and q axes are controllably adjusted to 0 and φ·ω, respectively Thus, for example, when the γ axis coincides with the d axis, the output values from the integral elements in the current feedback processing circuits M32 and M34 converge to converge the command voltages vγ* and vδ* to 0 and φ·ω, respectively, allowing the current flowing through the synchronous motor 34 to be controllably steadily set to zero. When the γ axis is shifted from the d axis, the command voltages vγ* and vδ* converge to values resulting from rotation of the vectors 0 and φ·ω, respectively through an angle corresponding to the amount of the shift, allowing the current flowing through the synchronous motor 34 to be controllably steadily set to zero.

Thus, when the control angle θc is equal to the electrical angle of the synchronous motor 34 or the amount of deviation from the electrical angle is constant, the current flowing through the synchronous motor 34 can be controllably set to zero. When the amount of deviation of the control angle θc from the actual electrical angle is not constant, the control may be disabled, preventing the command voltages vγ* and vδ* from taking appropriate values for setting the current flowing through the synchronous motor 34 to zero. In this case, the synchronous motor 34 may be unintentionally subjected to regenerative control. Even turn-off all of the switching elements SY# fails to avoid a possible situation where the synchronous motor 34 may be unintentionally subjected to regenerative control. This is because an electric path for a current flowing to the synchronous motor 34 via the diodes DΨp, the battery 40, and the diodes DΨn forms a closed loop. Thus, in the present embodiment, blockage processing for the relay RL is executed.

Figure 7:
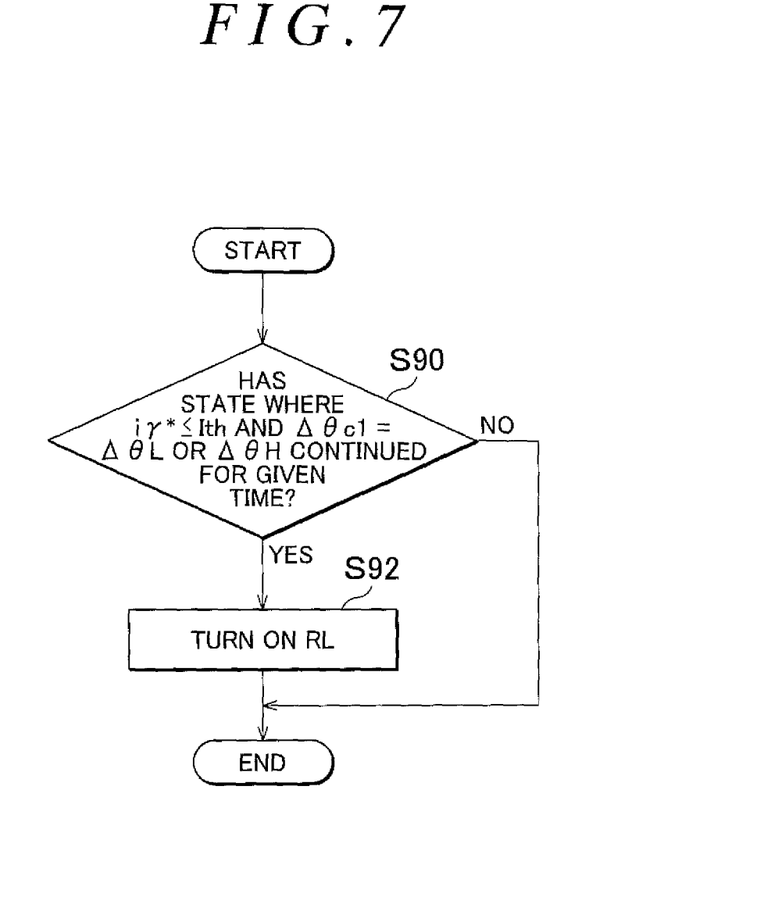
FIG. 7 is a flow diagram illustrating a procedure of blockage processing according to the first embodiment.

FIG. 7 illustrates a procedure of the blockage processing. This processing is repeatedly executed, for example, with a predetermined period by the CPU 52. In the series of processes illustrated in FIG. 7, the CPU 52 first determines whether or not a state has continued for a given time where the command current iγ* is equal to or smaller than a predetermined value Ith and where the estimated amount of change Δθc1 is at the lower limit value for estimation ΔθL or the upper limit value for estimation ΔθH (S90). This process is intended to determine whether or not the estimated amount of change Δθc1 accurately represents the amount of rotation corresponding to the electrical angle through which the synchronous motor 34 is rotated per predetermined time ΔT when the control angle θc has been updated according to the estimated amount of change Δθc1. That is, when the estimated amount of change Δθc1 is at the lower limit value for estimation ΔθL or the upper limit value for estimation ΔθH, the estimated amount of change Δθc2 estimated based on the induced voltage fails to be continuously equal to the estimated amount of change Δθc1. Thus, in this case, the amount of deviation of the control angle θc from the electrical angle of the synchronous motor 34 may fluctuate steadily.

Upon determining that the state has continued for the given time (S90: YES), the CPU 52 outputs a manipulation signal MS to the relay RL for turn-on of the relay RL (S92). The CPU 52 temporarily ends the series of processes when completing the processing in step 92 and making a negative determination in step S90.

Effects of the present embodiment will be described below. The relay RL is turned on if the estimated amount of change Δθc1 is fixed to a guard value (the lower limit value for estimation ΔθL or the upper limit value for estimation ΔθH) while the command current iγ* is kept at zero by the overheat protection processing. Thus, when the steering wheel 10 is operated to rotate the rotating shaft 34a, the electric path is blocked through which the battery 40 is charged by the synchronous motor 34 via the inverter INV.

The situation where the estimated amount of change Δθc1 is fixed to the guard value may occur when the lower limit value for estimation ΔθL or the upper limit value for estimation ΔθH stored in the memory 54 is inappropriate. That is, the situation may occur, for example, when the lower limit value for estimation ΔθL is slightly larger than the actual lower limit value that may taken while the synchronous motor 34 is controlled normally or when the upper limit value for estimation ΔθH is slightly smaller than the actual upper limit value that may be taken while the synchronous motor 34 is controlled normally. Thus, upon making an affirmative determination in step S90, the control apparatus 50 desirably gives external notification of the determination. If the upper limit value for estimation ΔθH or the lower limit value for estimation ΔθL excessively deviates from the value that may be taken during the normal state, even the torque feedback control is disabled. The present embodiment is assumed to deal with a case where a value is stored that is apparently difficult to be determined as a normal value or an abnormal value rather than a case where an excessively abnormal value is stored.

The above-described present embodiment produces effects described below.

(1) The relay RL is turned on under the conditions that the command current iγ* is equal to or smaller than the predetermined value Ith and that the estimated amount of change $\Delta\theta c1$ is fixed to the guard value (the lower limit value for estimation $\Delta\theta L$ or the upper limit value for estimation $\Delta\theta H$). This allows the synchronous motor 34 to be prevented from acting as a generator to charge the battery 40. Therefore, even when the guard process is executed on the estimated amount of change $\Delta\theta c2$ that is the amount of rotation of the synchronous motor 34 calculated based on the induced voltage, the synchronous motor 34 can be restrained from being unintentionally subjected to regenerative control.

(2) Under the condition that the command current $i\gamma^*$ is not zero, the update amount $\Delta\theta c$ for the control angle $\theta c$ is manipulated as the amount of operation for the torque feedback control, and the estimated amount of change $\Delta\theta c1$ is utilized for the guard process. With the torque feedback control in execution, even if the estimated amount of change $\Delta\theta c1$ is fixed to the guard value, the control angle $\theta c$ is manipulated to the appropriate value for setting the steering torque Trqs to the target torque Trqs*. Therefore, the synchronous motor 34 is unlikely to be unintentionally subjected to regenerative control. In contrast, when the command current $i\gamma^*$ is zero, the torque feedback control fails to function adequately, and thus, the update amount $\Delta\theta c$ is set in accordance with the estimated amount of change $\Delta\theta c1$ so that the estimated amount of change $\Delta\theta c1$ is utilized as the actual amount of rotation of the synchronous motor 34 per predetermined time $\Delta T$. In this case, if the estimated amount of change $\Delta\theta c1$ deviates from the actual amount of rotation of the synchronous motor 34 per predetermined time $\Delta T$, the amount of deviation of the control angle $\theta c$ from the actual rotation angle of the synchronous motor 34 may vary over time. Therefore, it is of particularly great significance that the condition for turn-on of the relay RL includes the condition that the command current $i\gamma^*$ is equal to or smaller than the predetermined value Ith.

(3) For an insufficient assist torque, the lower limit value $\Delta$Min is set equal to the amount of rotation larger than the estimated amount of change $\Delta\theta c1$. For an excessive assist torque, the upper limit value $\Delta$Max is set equal to the amount of rotation smaller than the estimated amount of change $\Delta\theta c1$. In this case, when the assist torque needs to be increased, the guard process itself manipulates the phase of the command current $i\gamma^*$ toward the advance side. When the assist torque needs to be reduced, the guard process itself manipulates the phase of the command current $i\gamma^*$ toward the retard side. Therefore, the guard process is unlikely to treat, as an inappropriate value, the update amount $\Delta\theta c3$ that is appropriate as the amount of operation for the torque feedback control. Thus, even if the estimated amount of change $\Delta\theta c1$ deviates from the actual amount of rotation of the synchronous motor, the estimated amount of change $\Delta\theta c1$ fixed to the guard value allows the steering torque Trqs to be controllably adjusted to the target torque Trqs* by the torque feedback control except when the guard value for the estimated amount of change $\Delta\theta c1$ is set excessively inappropriate. Therefore, it is of particularly great significance that the condition for turn-on of the relay RL includes the condition that the command current $i\gamma^*$ is equal to or smaller than the predetermined value Ith.

(4) Each of the current feedback processing circuits M32 and M34 includes the integral element. In this case, even when the control angle $\theta c$ has an error with respect to the actual rotation angle, if the error is constant, the output value from the integral element converges to allow setting of the command voltages $v\gamma^*$ and $v\delta^*$ needed to adjust the current flowing through the synchronous motor 34 to the command current $i\gamma^*$ and $i\delta^*$, respectively.

(5) When the overheat flag F is set to 1 to make a request for setting the command current $i\gamma^*$ to zero, the control angle $\theta c$ is gradually varied so as to reduce the torque before the command current $i\gamma^*$ is set to zero. Consequently, when a request is made for setting the command current $i\gamma^*$ to zero, the speed at which the torque of the synchronous motor 34 decreases can be reduced. When a gradual reduction in command current $i\gamma^*$ down to zero is performed instead of a gradual variation in control angle $\theta c$, a reduced command current $i\gamma^*$ hinders the update amount $\Delta\theta c$ for the control angle $\theta c$ from being appropriately set as the amount of operation for the torque feedback control. This makes a gradual reduction in the torque of the synchronous motor 34 difficult.

A second embodiment will be described with reference to the drawings with differences from the first embodiment focused on.

Figure 8:
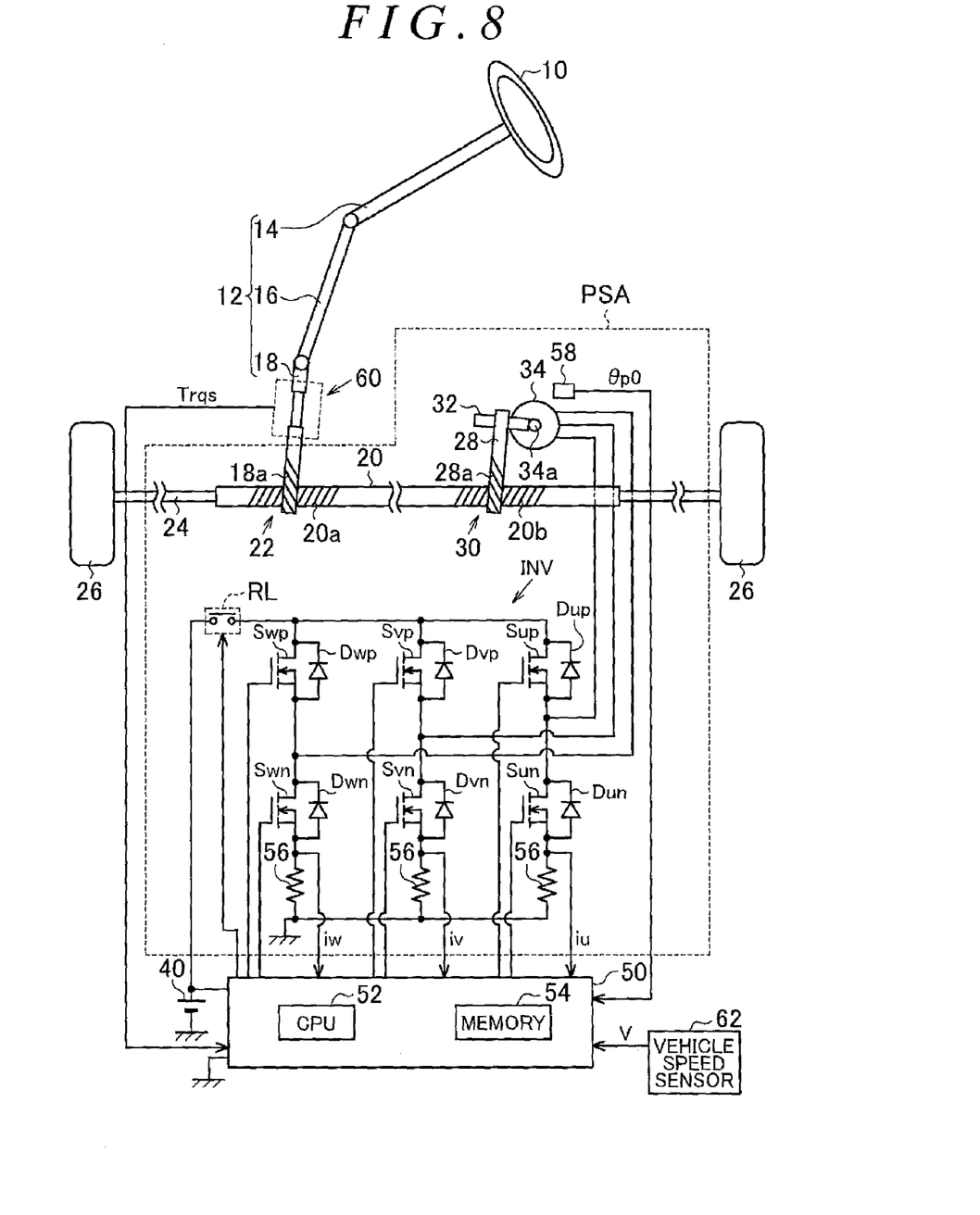
FIG. 8 is a diagram of a configuration of a steering system including a steering control apparatus according to a second embodiment.

FIG. 8 depicts a steering control apparatus and a steering system according to the present embodiment. Members in FIG. 8 that correspond to the members depicted in FIG. 1 are denoted by the same reference numerals for convenience. As depicted in FIG. 8, the present embodiment includes the relay RL that electrically connects and disconnects the inverter INV to and from the battery 40. In the present embodiment, the CPU 52 turns on the relay RL as the processing in step S92 in FIG. 7.

At least one of the matters of the above-described embodiments may be modified as described below. The torque acquisition processing circuit described in the SUMMARY OF THE INVENTION section corresponds to the CPU 52 that executes the processing in step S20 in accordance with the program stored in the memory 54. The blockage processing circuit corresponds to the CPU 52 that executes the processing in FIG. 7 in accordance with the program stored in the memory 54.

In the above-described embodiments, the current control processing circuit includes the command current setting processing circuit M24, the $\gamma\delta$ conversion processing circuit M26, the deviation calculation processing circuits M28 and M30, the current feedback processing circuits M32 and M34, the $\alpha\beta$ conversion processing circuit M36, the uvw conversion processing circuit M38, the PWM processing circuit M40, and the dead-time generation processing circuit M42. However, the invention is not limited to this. For example, each of the current feedback processing circuits M32 and M34 may include only an integral element or include a proportional element, an integral element, and a differential element.

In the above-described embodiments, the estimated-amount-of-change guard processing circuit (FIG. 3) includes the update amount calculation processing circuit M54 that executes the processing in FIG. 3 so as to configure estimated amount of charge. However, the invention is not limited to this. For example, the guard process may be executed using, as the upper limit value, a value $\Delta\theta c2(n-1)+\Delta X$ resulting from addition of a predetermined amount $\Delta X$ to the last estimated amount of change $\Delta\theta c2(n-1)$ and using, as the lower limit value, a value $\Delta\theta c2(n-1)-\Delta X$ resulting from subtraction of the predetermined amount $\Delta X$ from the last estimated amount of change $\Delta\theta c2(n-1)$. For example, the following guard processes may both be executed: a guard process using the upper limit value for estimation $\Delta\theta H$ and the lower limit value for estimation $\Delta\theta L$ that are the fixed values illustrated in FIG. 3, and a guard process using $\Delta\theta c2(n-1)+\Delta X$ as a lower limit value as the upper limit value and $\Delta\theta c2(n-1)-\Delta X$ as the lower limit value.

In the above-described embodiments, the estimation processing circuit includes the αβ conversion processing circuit M44, the induced voltage observer M46, the angle calculation processing circuit M48, and the speed calculation processing circuit M50. However, the invention is not limited to this. For example, the induced voltage may be estimated based on a current in a rotating coordinate system that rotates according to the estimated amount of change $\Delta\theta c2$ and a command voltage in the rotating coordinate system.

For the phase of the current flowing through the synchronous motor 34, in the above-described embodiments, the current flowing through the synchronous motor 34 is assumed to fall within the region in the rotating coordinate system between the positive side of the d axis and the positive side of the q axis. However, the invention is not limited to this. For example, the current may be controlled to fall within a region between the positive side of the q axis and a negative side of the d axis. In this case, a d axis current is negative, allowing field weakening control to be performed. Consequently, the synchronous motor 34 is likely to generate a torque at high rotation speed.

In the above-described embodiments, the control angle manipulation processing circuit includes the update amount calculation processing circuit M54 that executes the processing in steps S22 to S29 in FIG. 4. However, the invention is not limited to this. For example, the update amount $\Delta\theta c3$ may be calculated only by a proportional element using the difference between the target torque Trqs* and the steering torque Trqs as an input, or for example, only by an integral element, or for example, using a proportional element, an integral element, and a differential element.

For example, instead of the processing in step S28, the processing in step S30 may be executed, with the processing in step S36 omitted, when the target torque Trqs* is equal to or higher than the steering torque Trqs.

Moreover, a preset value X may be used to define the upper limit value $\Delta$Max by adding the value X as a first predetermined value to the estimated amount of change $\Delta\theta c2$ and to define the lower limit value $\Delta$Min by adding $-X$ as a second predetermined value to the estimated amount of change $\Delta\theta c2$.

Given the phase described in the section for the phase of the current flowing through the synchronous motor 34 described above, the following configuration may be used. That is, to make an affirmative determination in step S28 in FIG. 3, the CPU 52 may execute the processing in step S34. To make an affirmative determination in step S32 in FIG. 3, the CPU 52 may execute the processing in step S30. Furthermore, the preset value X may be used to define the upper limit value $\Delta$Max by adding the value X as the first predetermined value to the estimated amount of change $\Delta\theta c2$ and to define the lower limit value $\Delta$Min by adding $-X$ as the second predetermined value to the estimated amount of change $\Delta\theta c2$.

When the command current iγ* is not zero, the invention is not limited to the utilization of the estimated amount of change $\Delta\theta c1$ for the guard process. For example, the amount of operation ($\Delta\theta c3$) for the torque feedback control may be added to the estimated amount of change $\Delta\theta c1$. In this case, when the command current iγ* is equal to or smaller than a predetermined value, the process of adding the amount of operation for the torque feedback control to the estimated amount of change $\Delta\theta c1$ may be stopped.

A condition for stopping the torque feedback control is not limited to the condition that the command current iγ* is equal to or smaller than the predetermined value Ith such as the condition that the command current iγ* is zero. For example, the condition may be that the overheat flag F is 1.

The torque feedback control itself is not essential. That is, when the control angle θc is updated based on the estimated amount of change $\Delta\theta c1$, if the estimated amount of change $\Delta\theta c1$ continuously deviates from the actual amount of rotation of the synchronous motor 34, the synchronous motor 34 may not be appropriately controlled and may thus be subjected to regenerative control. Thus, the processing in FIG. 7 is effective.

In the above-described embodiments, the determination processing circuit includes the CPU 52 that executes the processing in step S70 in accordance with the program stored in the memory. However, the invention is not limited to this. For example, the steering control apparatus may be configured to set the command current iγ* equal to or smaller than a predetermined value when an abnormality occurs in the torque sensor 60 and the determination processing circuit may determine that a request has been made for setting the command current iγ* equal to or smaller than a predetermined value when an abnormality occurs in the torque sensor 60. An abnormality in the torque sensor 60 may be detected based on a detection value from the torque sensor 60 fixed to zero in connection with a traveling state of the vehicle.

In the above-described embodiments, the change processing circuit includes the CPU 52 that executes the processing in steps S72 to S76 in accordance with the program stored in the memory 54. However, the invention is not limited to this. For example, the update amount $\Delta\theta c$ may be varied to zero in a step-by-step manner. Even in this case, given the phase of the current in the above-described embodiments, the control angle θc is gradually varied so as to reduce the torque.

Given the phase described in the section for the current flowing through the synchronous motor 34, the control angle θc may be corrected so as to be gradually adjusted toward the advance side over a predetermined period using a value larger than the estimated amount of change $\Delta\theta c2$.

In the above-described embodiments, the temperature acquisition processing circuit includes the CPU 52 that executes the processing in step S50 in accordance with the program stored in the memory 54. However, the invention is not limited to this. For example, when the synchronous motor 34 is housed in the same housing as the control apparatus 50, if a sensor that detects the temperature of the control apparatus 50 is provided in the housing, detection values may be acquired from the sensor.

In the above-described embodiments, the limitation processing circuit includes the CPU 52 that executes the processing in step S78 in accordance with the program stored in the memory 54. However, the invention is not limited to this. For example, the command current iγ* may be set to, instead of zero, a specified value slightly larger than zero. In this case, the predetermined value Ith in FIG. 7 is set to be equal to or larger than the specified value.

The process of setting the current in the synchronous motor equal to or smaller than the predetermined value is not limited to the process of setting the command current iγ* equal to or smaller than the predetermined value (zero) on condition that the temperature Tm of the synchronous motor 34 is equal to or lower than the specified temperature Tth. For example, the command current iγ* may be set equal to or smaller than the predetermined value (zero) on condition that a charging rate of the battery 40 decreases. Even in this case, the torque of the synchronous motor 34 is preferably zero while the command current iγ* is equal to or smaller than the predetermined value. Thus, the processing in FIG. 7 is effective for avoiding regenerative control.

For the circuit breaker (RL), in the first embodiment, the relay RL is provided which activates and inactivates the electric path between each of the three terminals of the synchronous motor 34 and the inverter INV. However, the relay may activate and inactivate the electric path between two of the three terminals and the inverter INV. However, in this case, the relay needs to block all currents in both directions in an off state. In contrast, the relay RL in the first embodiment may permit a current to flow in one of the two directions through parasitic diodes as is the case with MOS field effect transistors. In the second embodiment, the relay RL is connected to the positive electrode of the battery 40. However, the invention is not limited to this. For example, the relay RL may be connected to the negative electrode. Both the relay RL depicted in FIG. 1 and the relay RL depicted in FIG. 8 may be provided.

For the target torque setting processing circuit (M22), in the above-described embodiments, the target torque Trqs* has a fixed value. However, the invention is not limited to this. For example, the target torque Trqs* may be set to vary according to the vehicle speed V. Specifically, the target torque Trqs* may be set higher when the vehicle speed V is high than when the vehicle speed V is low.

The steering control apparatus is not limited to the configuration including the CPU 52 and the memory 54 to execute only the software processing. For example, at least a part of the software processing in the above-described embodiments may be executed using dedicated hardware (ASIC). That is, the processing of the estimation processing circuit may be executed by hardware such that the CPU 52 acquires the estimated amount of change Δθc2 from the hardware.

The power conversion circuit (INV) is not limited to the above-described inverter INV. For example, the power conversion circuit (INV) may be a three-level inverter. In this case, even when the switching elements are turned off, turning on the relay RL is still effective if an electric path is formed through which the battery 40 is charged via diodes connected in anti-parallel with the switching elements.

The synchronous motor is not limited to the SPMSM but may be an interior permanent magnet synchronous motor. The steering system is not limited to a configuration including a rack-and-pinion steering operation actuator. For example, the steering system may include a rack-cross, rack-parallel, or rack-coaxial steering operation actuator.

What is claimed is:

1. A steering control apparatus intended to operate a steering system including a synchronous motor that generates an assist torque, a power conversion circuit that converts a voltage of a DC voltage source into an AC voltage and that applies the AC voltage to the synchronous motor, and a circuit breaker that blocks at least one of an electric path between the DC voltage source and the power conversion circuit and an electric path between the power conversion circuit and the synchronous motor, the steering control apparatus comprising:
  a current control processing circuit that manipulates a voltage applied to the synchronous motor by the power conversion circuit in order to controllably adjust a current flowing through the synchronous motor to a command value;
  an estimation processing circuit that estimates an induced voltage based on the current flowing through the synchronous motor and voltages applied to terminals of the synchronous motor by the power conversion circuit, and calculates an estimated amount of change that is an amount of rotation of the synchronous motor per predetermined time based on the induced voltage;
  an estimated-amount-of-change guard processing circuit that executes a guard process on the estimated amount of change;
  a control angle manipulation processing circuit that manipulates a control angle used as a rotation angle of the synchronous motor by the current control processing circuit in order to control the current, based on the estimated amount of change subjected to the guard process by the estimated-amount-of-change guard processing circuit; and
  a blockage processing circuit that operates the circuit breaker to block the electric path under conditions that the command value is equal to or smaller than a predetermined value and the estimated amount of change is fixed to a guard value set by the estimated-amount-of-change guard processing circuit.

2. The steering control apparatus according to claim 1, further comprising:
  a torque acquisition processing circuit that acquires a steering torque that is a torque input to a steering wheel; and
  a target torque setting processing circuit that sets a target torque that is a target value of the steering torque, wherein
  under a condition that the command value for the current is larger than the predetermined value, the control angle manipulation processing circuit sets an upper limit value for an update amount for the control angle to a value resulting from addition of a first prescribed value to the estimated amount of change,
  the control angle manipulation processing circuit sets a lower limit value for the update amount to a value resulting from addition of a second prescribed value to the estimated amount of change, and in order to perform feedback control for causing the steering torque acquired by the torque acquisition processing circuit to be adjusted to the target torque set by the target torque setting processing circuit, manipulates the control angle as a parameter that defines a phase of the current; and
  when the command value of the current is equal to or smaller than the predetermined value, the control angle manipulation processing circuit sets the update amount in accordance with the estimated amount of change subjected to the guard process by the estimated-amount-of-change guard processing circuit.

3. The steering control apparatus according to claim 2, wherein
  the feedback control is a control by which, when the steering torque is higher than the target torque, the update amount for the control angle is set to a value in a positive direction that is a rotating direction of the synchronous motor,
  when the command value for the current is larger than the predetermined value and the steering torque is higher than the target torque, the control angle manipulation processing circuit sets the first prescribed value equal to a sum of a predetermined amount and a width specified value and sets the second prescribed value equal to the predetermined amount, sets the lower limit value to a value resulting from addition of the predetermined amount to the estimated amount of change and thus the lower limit value corresponds to an amount of rotation larger than the estimated amount of change, and sets the upper limit value to a value resulting from addition of the width specified value to the lower limit value and thus the upper limit value corresponds to an amount of rotation larger than the lower limit value, and when the command value for the current is larger than the predetermined value and the steering torque is lower than the target torque, the control angle manipulation processing circuit sets the second prescribed value to a value resulting from multiplication of the sum of the predetermined amount and the width specified value by −1 and sets the first prescribed value to a value resulting from multiplication of the predetermined amount by −1, and thus sets the upper limit value to a value resulting from subtraction of the predetermined amount from the estimated amount of change and sets the lower limit value to a value resulting from subtraction of the width specified value from the upper limit value.

4. The steering control apparatus according to claim 2, wherein the current control processing circuit includes a current feedback processing circuit that sets a command voltage that is a command value for a voltage applied to the synchronous motor as an amount of operation needed to perform feedback control for causing a current flowing through the synchronous motor to be adjusted to the command value in a rotating coordinate system that rotates in accordance with a change in the control angle, and the current feedback processing circuit sets the command voltage based on an integral element using, as an input, a difference between the command value and the current flowing through the synchronous motor.

5. The steering control apparatus according to claim 2, further comprising:

a determination processing circuit that determines whether a request has been made for setting the command value for the current equal to or smaller than the predetermined value; and a change processing circuit that, when the determination processing circuit determines that the request has been made for setting the command value for the current equal to or smaller than the predetermined value, gradually varies the control angle so as to reduce the torque before the command value for the current is set equal to or smaller than the predetermined value.

6. The steering control apparatus according to claim 1, further comprising:

a temperature acquisition processing circuit that acquires a temperature of the synchronous motor; and a limitation processing circuit that limits the command value for the current to the predetermined value or smaller when the temperature acquired by the temperature acquisition processing circuit is equal to or higher than a specified temperature.

* * * * *